US009798025B2

(12) United States Patent
Elboth

(10) Patent No.: US 9,798,025 B2
(45) Date of Patent: Oct. 24, 2017

(54) REGULARIZATION OF MULTI-COMPONENT SEISMIC DATA

(71) Applicant: CGG SERVICES SA, Massy (FR)

(72) Inventor: Thomas Elboth, Oslo (NO)

(73) Assignee: CGG SERVICES SAS, Massy (FR)

( * ) Notice: Subject to any disclaimer, the term of this patent is extended or adjusted under 35 U.S.C. 154(b) by 841 days.

(21) Appl. No.: 14/246,246

(22) Filed: Apr. 7, 2014

(65) Prior Publication Data

US 2014/0365131 A1 Dec. 11, 2014

Related U.S. Application Data

(60) Provisional application No. 61/832,516, filed on Jun. 7, 2013.

(51) Int. Cl.
| | |
|---|---|
| *G01V 1/00* | (2006.01) |
| *G01V 1/28* | (2006.01) |
| *G01V 1/36* | (2006.01) |
| *G06F 11/30* | (2006.01) |
| *G01V 1/38* | (2006.01) |

(52) U.S. Cl.
CPC .............. *G01V 1/28* (2013.01); *G01V 1/36* (2013.01); *G01V 1/38* (2013.01); *G01V 2210/1423* (2013.01); *G01V 2210/57* (2013.01)

(58) Field of Classification Search
CPC ........................................................ G01V 1/28
See application file for complete search history.

(56) References Cited

U.S. PATENT DOCUMENTS

| | | | |
|---|---|---|---|
| 6,901,333 B2 | 5/2005 | Van Riel et al. | |
| 7,523,003 B2 | 4/2009 | Robertsson et al. | |
| 7,715,988 B2 | 5/2010 | Robertsson et al. | |
| 7,944,774 B2 * | 5/2011 | Monk | G01V 1/3808 |
| | | | 181/101 |
| 8,396,668 B2 | 3/2013 | Robertsson | |
| 2011/0242935 A1 | 10/2011 | Amundsen et al. | |

OTHER PUBLICATIONS

David J. Monk, "Reducing infill Requirements Using Fresnel Zone Binning and Steerable streamers," published in SEG Denver Oct. 17-22, 2010 Annual meeting, pp. 3802-3806.
David J. Monk, "Fresnel Zone Binning: Fresnel Zone Shape with Offset and Velocity," published in Geophysics, vol. 75, No. 1, Jan.-Feb. 2010, pp. T9-T14.
David J. Monk, "Fresnel Zone Binning: Application to 3D Seismic Fold and Coverage Assessment," published in Leading Edge, Mar. 2009, pp. 288-295.
Paul Young et al., Alternative Coverage Analysis Method Reduces Infill Shooting, published in World Oil Magazine, vol. 231, No. 9, Sep. 2010.

* cited by examiner

*Primary Examiner* — Phuong Huynh
(74) *Attorney, Agent, or Firm* — Patent Portfolio Builders PLLC

(57) ABSTRACT

Presented are methods and systems for regularizing content of multi-component seismic data. The method includes a step of receiving the seismic data, wherein the seismic data includes pressure and particle motion measurements and a step of regularizing and frequency optimizing the seismic data to desired positions based on Fresnel zones selected at various depths in a subsurface to obtain a regularized seismic dataset.

18 Claims, 8 Drawing Sheets

REGULARIZATION OF MULTI-COMPONENT SEISMIC DATA

RELATED APPLICATION

The present application is related to, and claims priority from U.S. Provisional Patent Application No. 61/832,516, filed Jun. 7, 2013, entitled "METHOD FOR REGULARIZATION OF MULTICOMPONENT DATA," to Thomas ELBOTH, the entire disclosure of which is incorporated herein by reference.

TECHNICAL FIELD

Embodiments of the subject matter disclosed herein generally relate to methods and systems for seismic data processing and, more particularly, to mechanisms and techniques for regularization of seismic data.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

Mapping subsurface geology during exploration for oil, gas, and other minerals and fluids uses a form of remote sensing to construct two-dimensional or three-dimensional images of the subsurface. The process is known as seismic surveying.

Four-dimensional images can also be created by comparing two or more 3-D images acquired at different times to look for changes in the subsurface caused by for example gas injection or production.

Looking to FIG. 1, marine seismic data acquisition, as used, for example, for exploration, field development, and/or production monitoring (time lapse), is normally conducted by a tow vessel 102 towing long cables 104, 108, some of them with seismic sensors 106 through the water. These cables are known as "lead-ins" 104 and "streamers" 108 to people skilled in the art. The streamers 108 are equipped with a large number of seismic sensors 106 with which recordings are made from subsurface reflections of acoustic energy that originate from a seismic source 110 as, for example, a pressure source such as air guns, vibrators, etc. towed behind the seismic vessel 102. A towed array can include one or more streamers 108.

Each time a seismic source 110 is activated, it emits a seismic signal that travels downward through the earth, is reflected, and, upon its return, is received by the seismic sensors 106 in the streamer(s) 108. Each streamer 108 contains a plurality of seismic sensors 106 at spaced apart locations. The received signals are recorded by recording devices. Recorded signals from multiple seismic source 110 and seismic sensor 106 combinations are then processed, assembled and/or combined to create a nearly continuous profile of the subsurface that can extend for many miles. In a two-dimensional (2-D) marine seismic survey, the reflected signal is recorded by the seismic sensors 106 on a single streamer 108, whereas in a three-dimensional (3-D) survey a number of streamers 108 are used simultaneously. In simplest terms, a 2-D seismic line can be thought of as a vertical slice of the earth layers directly beneath the streamer 108. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey.

A seismic streamer 108 will typically be several kilometers long, and be comprised of several hundred sensors designed to pick up reflected waves from the subsurface. It is normally also equipped with compasses, acoustic pingers 112, depth sensors and other auxiliary units that give continuous location information about heading, position and depth. Furthermore, each streamer is typically equipped with attached units known as birds 114 that control the heading and depth of that streamer 108.

Chapter 1, pages 9-89, of "Seismic Data Processing" by Özdogan Yilmaz, Society of Exploration Geophysicists, 1987, contains general information relating to conventional 2-D processing and its disclosure is incorporated herein by reference. General background information pertaining to 3-D data acquisition and processing may be found in Chapter 6, pages 384-427, of Özdogan Yilmaz.

A seismic trace is usually a digital recording of the acoustic energy that is received or otherwise picked up by one or more seismic sensors 106. Typically, a trace is determined by combining a group of seismic sensors 106 over a certain length, in some examples referred to as a "receiver length" or "group length". In some examples, a group of seismic sensors 106 is referred to as a "receiver". In marine seismic, this group length is typically between 3.125 meters and 12.5 meters, but in some examples, a seismic trace can also be a recording of a received seismic signal from one single seismic sensor 106. In some examples, a "seismic sensor" 106 refers to a single seismic sensor 106 or a group of seismic sensors 106 in a streamer 108 ("receiver").

In seismic acquisition, the location on the surface halfway between the center of the seismic source 110 and the center of the seismic sensor 106 is referred to as a common mid-point (CMP) and is typically shared by numerous pairs of seismic sources 110 and seismic sensors 106. The CMP location of every trace in a seismic survey is tracked and is generally made a part of the trace header information. This allows the seismic information contained within the traces to be later correlated with specific surface and subsurface locations, thereby providing a means for placing and displaying the trace in its correct position.

A problem often encountered during seismic acquisition is that data are sampled irregularly. The reason for this can be streamer 108 and/or source 110 feathering (the streamer is not towed straight through the water due to ocean currents), obstructions that force the vessel 102 to deviate from the desired course and various mishaps result in missing data. This lack of regular sampling is especially problematic in the cross-line direction (perpendicular to the towing direction), where the data is less well sampled compared to the in-line direction.

To compensate for missing data, it is possible in seismic processing to perform data interpolation and regularization. The goal of this is to ensure that all locations in the subsurface are adequately sampled. However, interpolation is normally limited by the Shannon/Nyquist sampling theorem, stating that a function x(t) cannot contain frequencies higher than B hertz, given its sampling factor of 1/(2B)

seconds apart. Interpolation beyond Nyquist will, unless some other information is utilized in the process, result in aliased data.

Traditionally, seismic streamers 108 have only contained hydrophone sensors 106 designed to pick up pressure data. However, a recent trend in the industry has been to also include sensors 106 designed to pick up acceleration or pressure gradient/differential data. With the new types of sensors in a seismic streamer, a so called multi-component streamer is created. The main benefit of these new types of sensors 106 (or streamers) is they enable additional information to be derived from the recorded data. The embodiments herein describe the use of the vertical (Vz) and the horizontal (Vy) velocity, acceleration, pressure gradient or differential to facilitate accurate data regularization and interpolation within the measured location (CMP).

Having access to both pressure and pressure gradient data at each sensor location allows for data interpolation and extrapolation beyond the Nyquist limit. Some of these techniques for generating general interpolated/extrapolated data can be found in U.S. Pat. No. 8,396,668 entitled "Marine Seismic Surveying Employing Interpolated Multi-component Streamer Pressure Data" by J. O. A. Robertsson and incorporated herein by reference, U.S. Pat. No. 7,715,988 entitled "Interpolating and Deghosting Multi-Component Seismic Sensor Data" by J. O. A. Robertsson, P. Caprioli and A. K. Ozdemir and incorporated herein by reference and U.S. Pat. No. 7,523,003 entitled "Time Lapse Marine Seismic Surveying" by J. O. A. Robertsson, L. Canales, C. Kostov, L. Meister, E. J. Muyzert and L. C. Morley and incorporated herein by reference. Further, techniques for predicting data corresponding to source locations other than the source locations at which the source was actuated is described by L. Amundsen, H. Westerdahl and M. Thompson in their U.S. Patent Application Publication number 20110242935 entitled "Method of Providing Seismic Data" and incorporated herein by reference. In general for the aforementioned techniques, seismic data is predicted for locations where seismic data was not sampled and added to the sampled seismic data to create a regularly and uniformly sampled seismic data set.

Accordingly, it would be desirable to provide systems and methods that avoid the afore-described problems and drawbacks associated with interpolating and/or extrapolating seismic data to new locations, but instead provide methods and systems to generate seismic images based on actual seismic data where it was measured.

SUMMARY

According to an embodiment, there is a method for regularizing seismic data. The method includes receiving the seismic data, wherein the seismic data includes pressure and particle motion measurements; and regularizing and frequency optimizing the seismic data to desired positions based on Fresnel zones selected at various depths in a subsurface to obtain a regularized seismic dataset.

According to another embodiment, there is a computing system for regularizing seismic data. The system includes an interface for receiving the seismic data, wherein the seismic data includes pressure and particle motion measurements; and a processor connected to the interface. The processor is configured to regularize and frequency optimize the seismic data to desired positions based on Fresnel zones selected at various depths in a subsurface to obtain a regularized seismic dataset.

According to still another embodiment, there is a non-transitory computer readable medium including computer executable instructions, wherein the instructions, when executed by a computer, implement a method for regularizing seismic data. The instructions include receiving the seismic data, wherein the seismic data includes pressure and particle motion measurements; and regularizing and frequency optimizing the seismic data to desired positions based on Fresnel zones selected at various depths in a subsurface to obtain a regularized seismic dataset.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
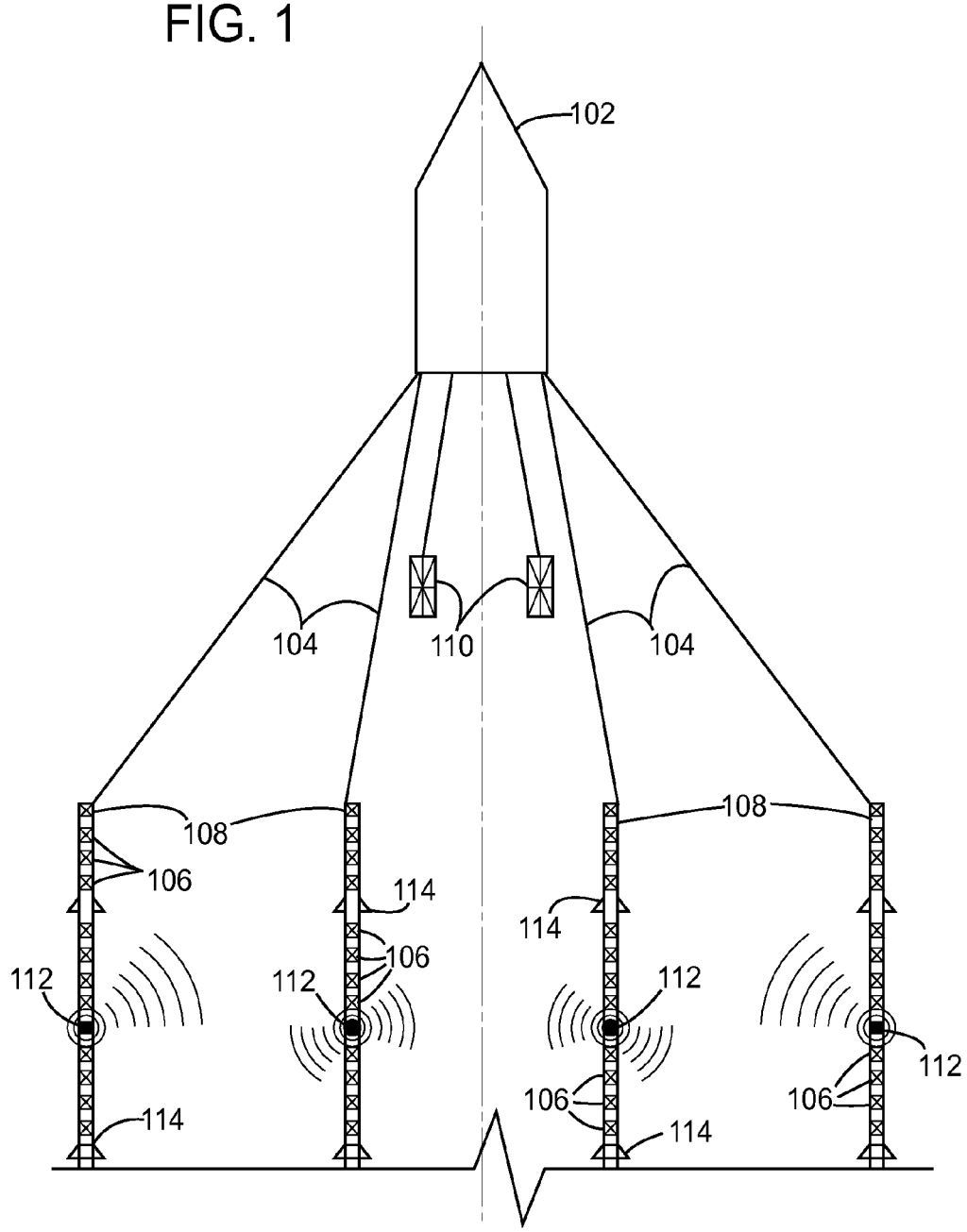
FIG. 1 depicts a marine seismic data acquisition system.

The following description of the exemplary embodiments refers to the accompanying drawings. The same reference numbers in different drawings identify the same or similar elements. The following detailed description does not limit the invention. Instead, the scope of the invention is defined by the appended claims. However, the embodiments to be discussed next are not limited to the configurations described in the drawings, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments herein, methods and systems are disclosed for regularizing and/or optimizing the collected (actual) seismic data based on Fresnel zones selected around locations where the seismic data was measured. The collected seismic data may be sorted to a common midpoint (CMP) domain. However, other domains may also be used for sorting the recorded seismic data.

In order to provide some context for the subsequent embodiments related to regularizing and/or optimizing seismic data based on sorting to a common midpoint position in a Fresnel zone context, consider the following references with regard to the use of Fresnel zones in seismic data computations, U.S. Pat. No. 7,944,774 entitled "Method for Determining Adequacy of Seismic Data Coverage of a Subsurface Area Being Surveyed and Its Application to Selecting Sensor Array Geometry" by D. Monk and P. G. Young and incorporated herein by reference, three articles published in 2010 by D. J. Monk entitled "Reducing Infill Requirements Using Fresnel Zone Binning and Steerable streamers," published in SEG Denver 2010 Annual meeting and incorporated herein by reference, "Fresnel Zone Binning: Fresnel Zone Shape with Offset and Velocity," published in Geophysics, 75, Number 1, T9-T14 and incorporated herein by reference, "Fresnel Zone Binning: Application to 3D Seismic Fold and Coverage Assessment, published in Leading Edge and incorporated herein by reference and an article authored by P. Young and D. J. Monk in 2010 entitled "Alternative Coverage Analysis Method Reduces Infill Shooting," published in World Oil Magazine, September 2010 and incorporated by reference.

Figure 2:
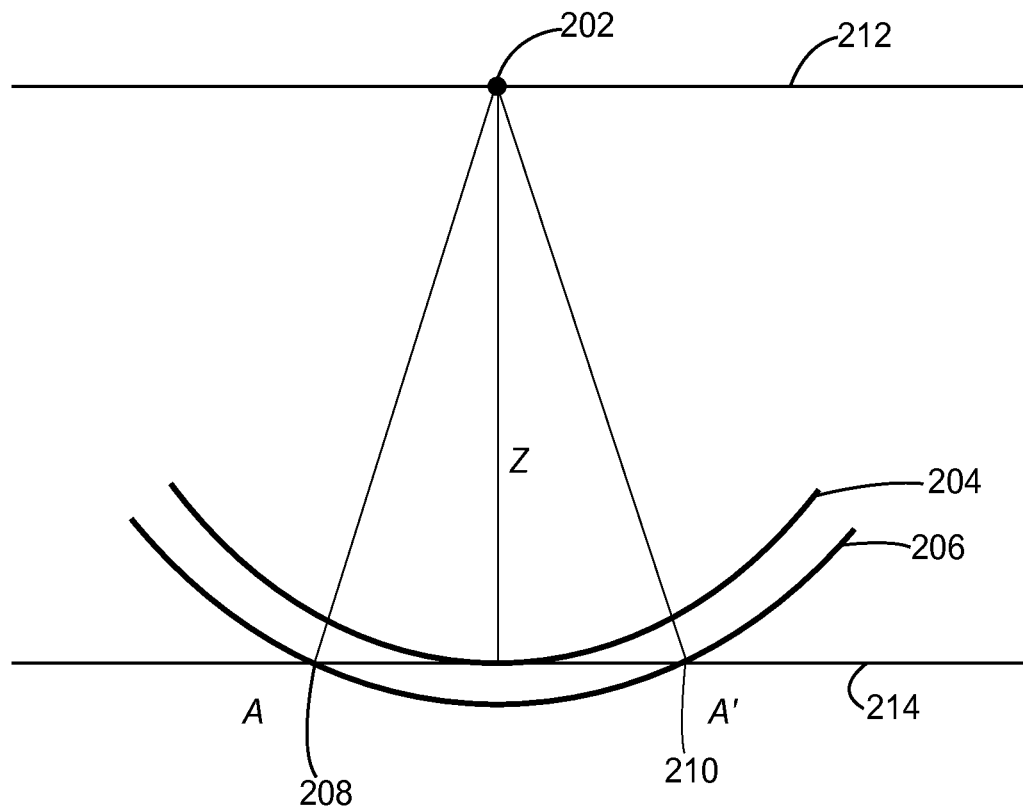
FIG. 2 depicts an area of a Fresnel zone associated with these embodiments.

Considering the embodiments described herein, the definition of a "Fresnel zone" is the area on a reflector (where the reflector may be defined as a velocity contrast in the subsurface that causes seismic energy to be reflected) contained substantially within one quarter wavelength of an illuminating wave. More specifically, looking to FIG. 2, a Fresnel zone is defined by locations 208 and 210 where a second wave-front 206 intersects reflector 214. Wave-front 206 is obtained by considering a source 202 at or near the surface 212 emitting a wave that propagates toward the reflector. A first wave-front 204 reaches (i.e., the reflector is tangent to the first wave-front) the reflector 214 and the second wave-front 206 propagates one fourth of the wavelength of the wave from the first wave-front 204. Thus, based on this definition of the Fresnel zone, the reflected signal is a result of the property of the reflector within the Fresnel zone bounded at reflector locations "A" 208 and "A'" 210. It should be noted that a reflection thought of as coming back to the surface from a point is actually being reflected from an area having the dimension of the Fresnel zone.

Figure 3:
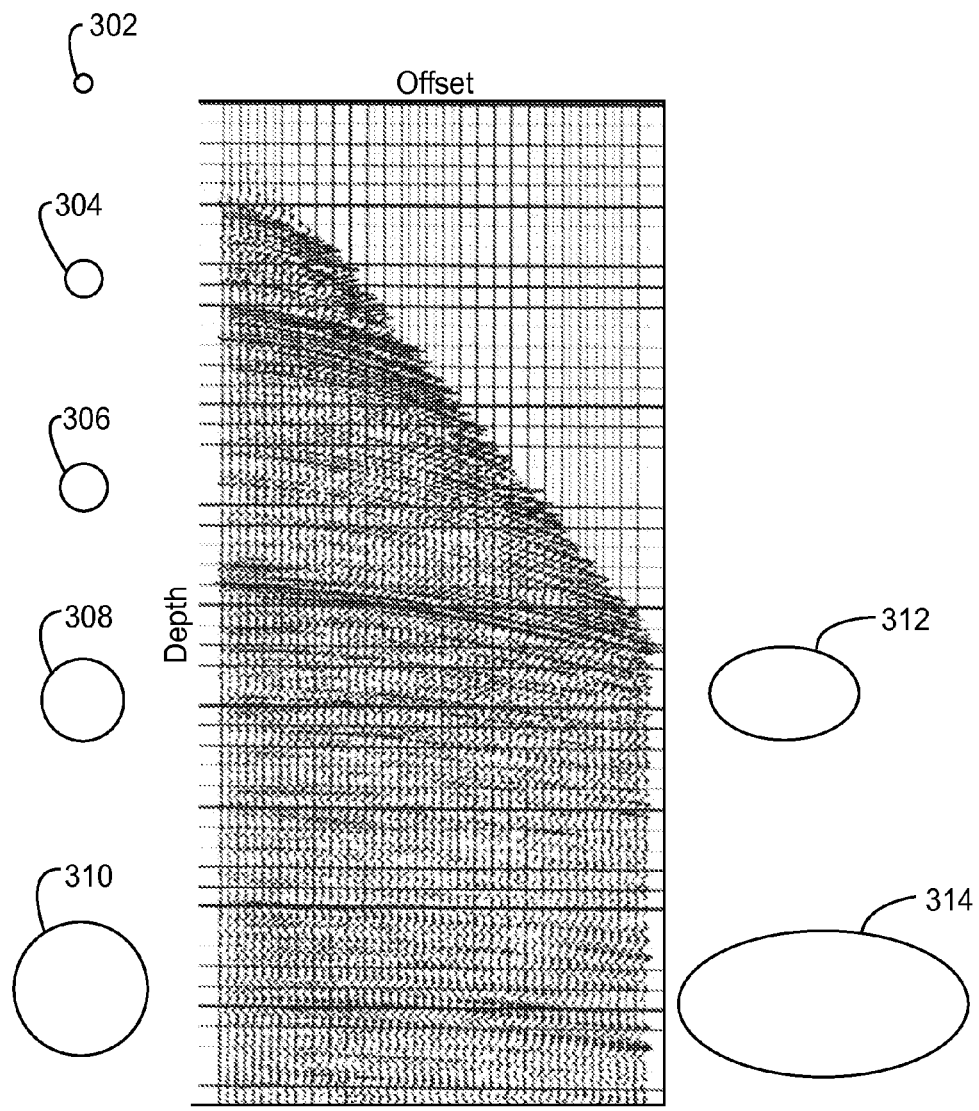
FIG. 3 depicts offset and depth Fresnel zone dependencies associated with these embodiments.

FIG. 3 illustrates how a Fresnel zone changes its shape at various depths and/or offsets. In general, the Fresnel zone will increase in size with offset and depth. This is because the earth generally absorbs high frequency acoustic waves quicker than low frequency waves. This process shifts the dominant frequencies of the reflected data to lower frequencies (larger wavelengths) with reflector depth. Since the Fresnel zone is a function of the wavelength, it increases in size as the wave goes deeper into the subsurface. It should be noted that a Fresnel zone will remain substantially circular in shape directly below the source and will increase in diameter as the depth increases, as illustrated by circles 302 to 310, and the Fresnel zone will change its shape, e.g., becoming elliptical in shape and will increase in diameters with increasing offset and increasing depth, as illustrated by zones 312 and 314. Thus, a Fresnel zone is depth (or frequency) and offset dependent.

According to an embodiment, a method is now discussed for regularizing and/or optimizing the recorded seismic data (e.g., traces) based on Fresnel zones. For simplicity, consider that a Fresnel zone 402 has been selected at a given depth 1 km, for a given frequency f. The given depth and given frequency may be selected by the person performing the calculations, based on prior experience, seismic survey characteristics, or other criteria. The given depth may be selected based on the subsurface of interest, for example, if a reservoir is explored at a depth between 1 and 3 km, the given depths may be around this range. One way to select the given frequency f is to consider a dominant frequency in the survey data, for example, a frequency between 10 and 30 Hz. Other values are also possible. In one application, a dominant frequency is a frequency that is not easily absorbed by the medium, thus, standing a good chance to be received at the seismic sensors.

Figure 4:
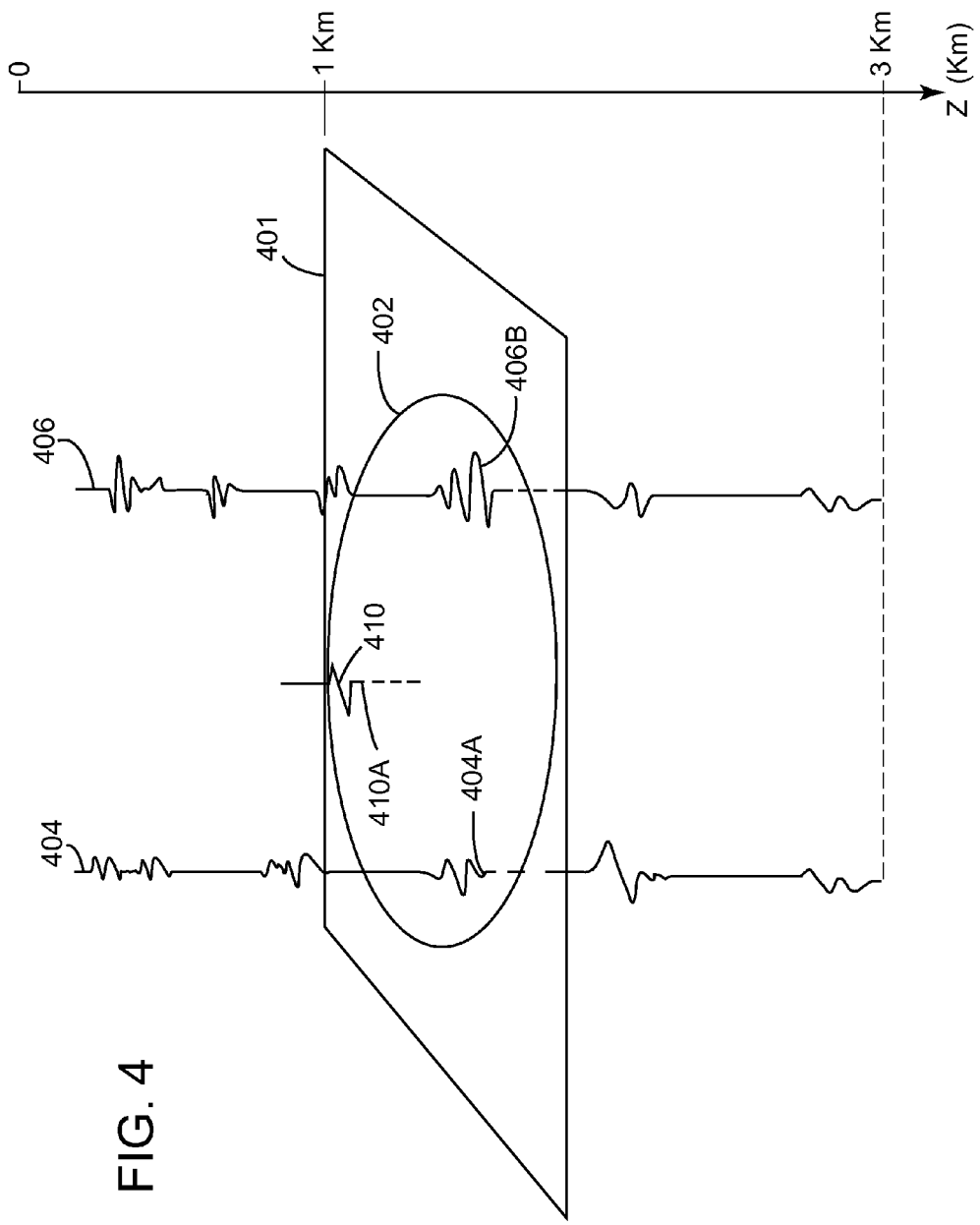
FIG. 4 is a schematic illustration of a Fresnel zone and associated traces.

Further, consider that two traces 404 and 406 have been recorded with seismic sensors and they are within a selected Fresnel zone 402. For the sake of the example, consider that traces 404 and 406 extend from 0 to 3 km as illustrated in FIG. 4. Those skilled in the art would know that the traces may extend to other depths, depending on the nature of the subsurface, the zone of interest in the subsurface, the amount of energy imparted to the medium by the sources, etc. These two traces intersect the Fresnel zone at locations 406A and 408A. A method of optimizing the frequency content of the traces within the Fresnel zone may be applied to generate a new trace portion 410, based on the measured traces 404 and 406. Such optimizing method may include a process of regularizing the traces at desired locations and/or interpolating/combining the traces in such a way that the new trace is optimal on terms of one or more criteria. Examples of criteria can be spectral flatness, spectral shape (compared to neighboring traces), lack of aliasing or any other measure that can be computed to evaluate the quality of the new trace. Note that using a single Fresnel zone generates only a portion 410 of the new trace at around the depth of the Fresnel zone. In order to generate the entire trace, i.e., to extend from 0 to 3 km in the example of FIG. 4, the above optimizing method should be applied to other Fresnel zones having different depths, between 0 and 3 km. In other words, this procedure of generating a new trace portion should be repeated for the next depth, e.g., in a sliding window that gradually moves deeper and deeper or shallower and shallower, depending on the starting point. In this way, a full new trace is generated that has optimized frequency content and is regularized at a desired location in the inline and cross-line directions.

In other words, the definition of "optimizing frequency content" includes obtaining an unaliased trace with the best possible frequency content by combining nearby traces noting that all of the nearby traces are within the Fresnel Zone covered by each common midpoint (CMP). Note that the example illustrated in FIG. 4 shows only two measured traces 404 and 406. In practice, a Fresnel zone may include any number of measured traces, depending on the density of the acquired data and the depth of the Fresnel zone. In one application, all the measured traces in the Fresnel zone are considered for calculating the new trace. However, in another application, a subset of the measured traces in the Fresnel zone is used for calculating the new traces. Still, in another application, more than one new trace is calculated for a Fresnel zone. Further, the algorithm noted above can be extended to other Fresnel zones at the same depth as the original Fresnel zone. In a more general way, for a given depth, e.g., 1 km, an entire plane 401 having that depth may be considered and it may be divided in various shapes (e.g., triangulation) for organizing all the measured traces and the new traces. These shapes may cover all the Fresnel zones 402 in plane 401 at the given depth. In one application, for a given depth, a Fresnel zone is determined for each CMP point.

Returning to FIG. 4, as is known to persons skilled in the art, aliasing will occur if the Nyquist criterion is not fulfilled during any interpolation process. However, by incorporating information from the pressure gradient/acceleration/velocity sensors in the process, it is possible to relax the Nyquist criteria, e.g., accurately interpolate/extrapolate or regularize seismic data (recorded traces) further than the limits given by Nyquist. Further, the term "regularization" used in this embodiment includes a process of creating at least a new trace, but more preferably a dataset which is regularly sampled. This process may use a moving and/or interpolating scheme to generate new traces at positions laid out on a regular horizontal or near horizontal grid. The regularization process may be necessary because, during the acquisition process, the streamers and/or sources may not exactly follow the pre-plot lines and, thus, the collected data is not regularly sampled. Also, the seismic sensors distributed along the streamers are spaced with a first distance while the same sensors are spaced in the cross-line direction according to a second distance, usually larger than the first distance. Thus, there is an interest to create new traces between the streamers so that the new traces are separated by the first distance or another common distance, different from the second distance, in both the inline and cross-line direction.

Another embodiment may employ a multi-dimensional 4-D or 5-D interpolator as known to a person skilled in the art of seismic processing.

According to another embodiment, a description of a technique for regularizing and optimizing the frequency content of traces includes the steps of 1) sorting the acquired seismic data into the common midpoint domain (The process of sorting seismic data to the CMP domain is routinely done in conventional seismic processing, and is known to one skilled in the art of seismic processing. In the CMP domain, the data may also be NMO-corrected, which is another process known to one skilled in the art of seismic processing.); 2) for a trace of a common midpoint, first compute the Fresnel zone for the sampled location, then regularize the seismic data in the cross-line direction by creating a virtual trace at a desired position, noting that the desired position of the virtual trace is within the Fresnel zone and that the frequency content of the virtual trace may be optimized/maximized by combining data from other traces present within the Fresnel zone of the common midpoint; and 3) iterate through each Fresnel zone. In one application, the Fresnel zones are computed from a desired or a dominant frequency in the reflection data. For example, assume reflection data with a dominant frequency of 30 Hz, a near trace with close to zero offset and a speed of sound (c) at the reflector of 3000 m/s. The radius of the Fresnel zone can be calculated to be approximately fifty meters.

Other considerations to note is that the traces, i.e., measurements, are optimally combined to reconstruct the true wave field at the given locations providing the benefit that the combination process can take advantage of all the components present in a multi-component (MC) trace.

Figure 5:
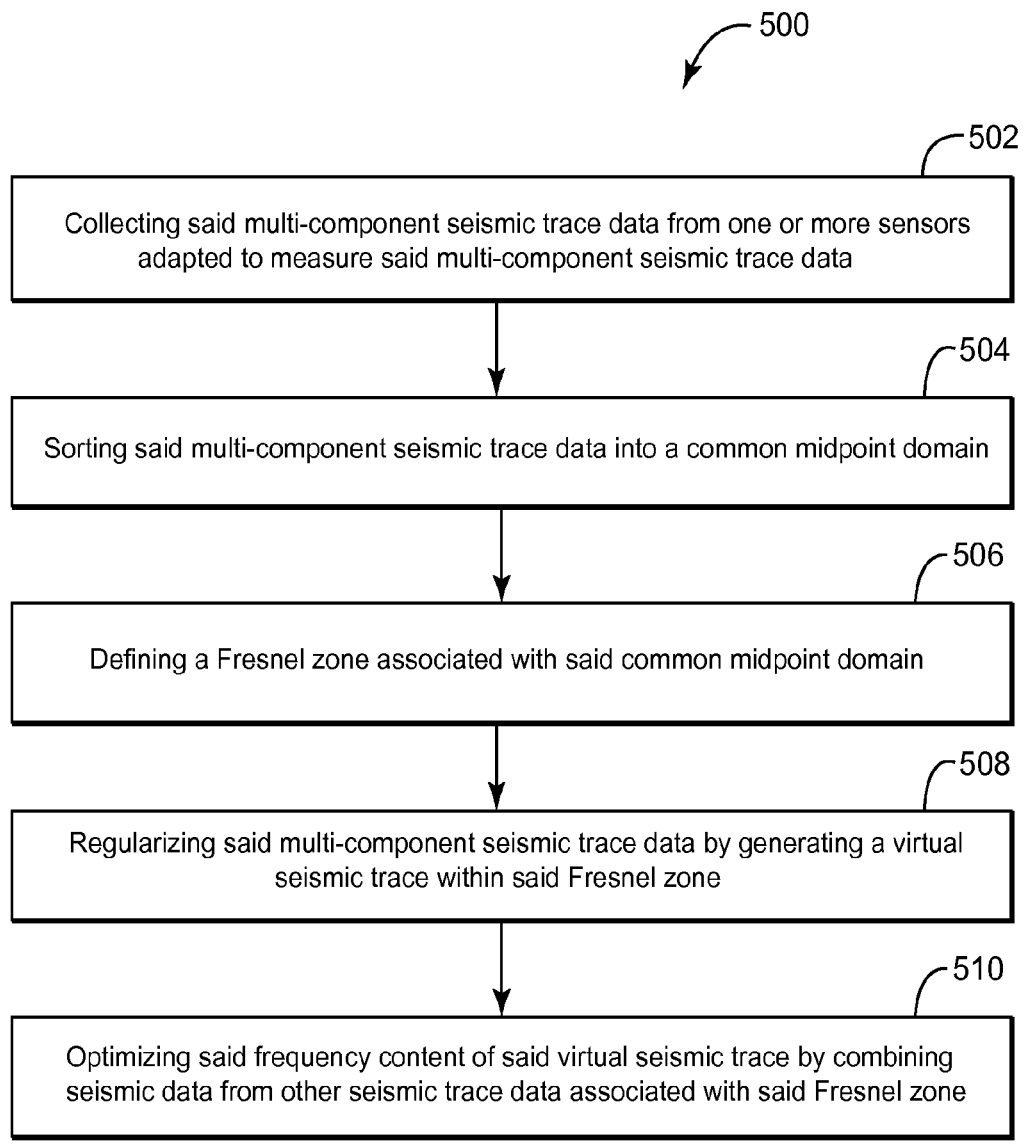
FIG. 5 depicts a flowchart of a method for regularizing and frequency optimizing seismic data.

Looking now to FIG. 5, a method 500 for regulating seismic trace data is depicted. Starting with step 502, the method 500 collects/receives the multi-component seismic data from one or more sensors adapted to measure the multi-component seismic trace data. Continuing at step 504, traces of the multi-component seismic data are sorted into a common midpoint domain, where it may be NMO-corrected. Next, at step 506, a Fresnel zone, associated with each common midpoint, is computed. In one application, the Fresnel zones are selected for a given frequency and plural depths of interest. Continuing at step 508, the traces are regularized based on generating at least one virtual seismic trace within the Fresnel zone. It should be noted that both pressure and gradient pressure data (or particle motion data) can be used in this step to allow for the best possible result. Next, at step 510, the frequency content of the new virtual seismic trace is optimized (to avoid/minimize aliasing in the resultant data, and to be as accurate as possible) by combining seismic data from other seismic trace data associated with the Fresnel zone. Furthermore, additional constraints can be placed on the new virtual trace before it is accepted, i.e., spectral flatness, spectral shape, lack of aliasing or any other measure that can be computed to evaluate the quality of the new trace. Further examples of additional constraints can be that the virtual trace should be associated with a given source position, the virtual trace should contain sufficient unaliased energy in a one or more predetermined frequency bands, the frequency content is based on spectral flatness over one or more predefined frequency range(s) and the optimizing is iterated over an increasing refined binning grid.

Figure 6:
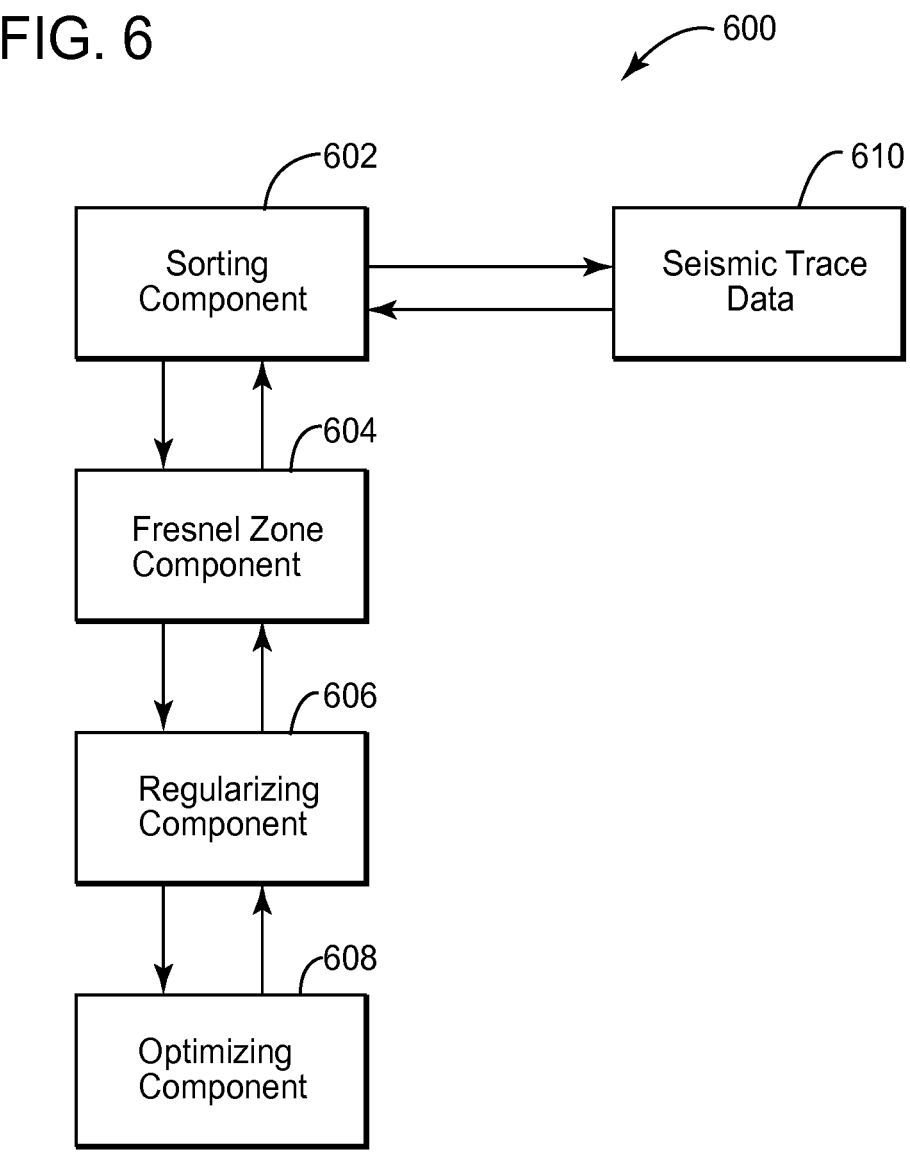
FIG. 6 depicts various aspects of software components or modules which can be used to implement the embodiments.

Looking now to FIG. 6, a schematic diagram of a processing node 600 for optimizing frequency content and/or regularization of multi-component seismic trace data is depicted. The processing node 600 includes a sorting component 602, a Fresnel zone component 604, a regularizing component 606, an optimizing component 608 and a seismic trace dataset 610. The sorting component 602 provides the capability to sort multi-component seismic trace data 610 into a common midpoint (CMP) domain or another domain.

The Fresnel zone component 604 provides the capability to define a Fresnel zone associated with the aforementioned common midpoint domain. For a given set of seismic data, many Fresnel zones are defined at different depths of interest and having different frequencies. The regularizing component 606 provides the capability for generating a virtual seismic trace within the Fresnel zone. This component may use any known method in the field, for example, interpolation, intrapolation, etc. It should be noted that the virtual seismic trace can be generated based on interpolating or extrapolating pressure and/or particle motion values associated with the Fresnel zone and that both the pressure and the particle motion data may be used in this process. Next, the optimizing component 608 provides the capability to combine data from seismic traces data associated with the Fresnel zone for generating the optimized frequency new trace.

Figure 7:
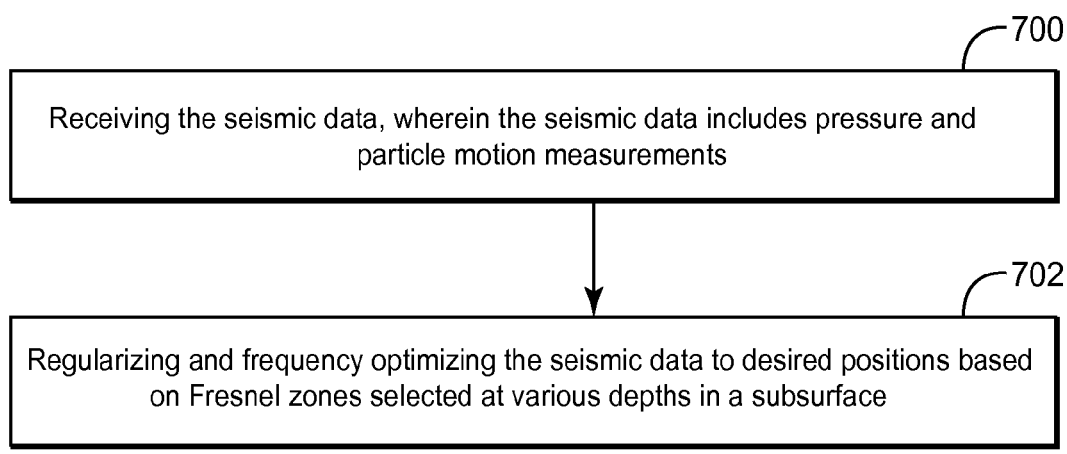
FIG. 7 is a flowchart of another method for regularizing and frequency optimizing seismic data.

According to another embodiment illustrated in FIG. 7, there is a method for processing seismic data such that new traces are generated and the new traces are regularized and frequency optimized. The method includes a step 700 of receiving the seismic data, where the seismic data includes pressure and particle motion measurements. The seismic data is received, for example, by a processor from a memory that stores the seismic data. The processor may be located on a vessel or on a land facility. The seismic data may be stored on any other physical medium, e.g., tapes. The method also includes a step 702 of regularizing and frequency optimizing the seismic data to desired positions based on Fresnel zones selected at various depths in the subsurface. The desired positions may be, for example, between the streamers, if streamers are used for collecting the seismic data. In one application, the desired positions form a grid. The grid may have a same step along the inline and cross-line directions, which may be different from a cross-line separation between the recording seismic sensors. Note that the seismic data may be acquired by other means, e.g., ocean bottom cables or autonomous underwater vehicles. Even for these cases, there may be a desire to generate the new traces in between the positions of the seismic sensors that recorded the data. Note that in one application, the regularizing and frequency optimization are jointly performed. However, in another application, the seismic data is first regularized and then frequency optimized.

The method may optionally include, iterating the frequency optimizing step over an increasingly refined binning grid. In one application, the regularized seismic dataset that includes the new traces is stored and later compared to another regularized seismic dataset obtained from another seismic survey performed for the same subsurface. In other words, a 4-D seismic survey may be conducted and the seismic data from the base survey or the monitor survey or both may be regularized and frequency optimized to match each other for detecting changes in the subsurface over time.

In most cases the embodiments would be applied on 3-D seismic data acquired by a seismic vessel. The general idea is however also applicable to multi-component seismic data acquired on ocean bottom nodes or on land. Also, the embodiments can be used in connection with 4-D time-lapse surveys, as noted above, where data from one survey are regularized to match data from another survey. In this respect, the following comments may apply to any of the embodiments discussed herein.

Particle velocity data may be obtained from individual sensors, or summed (average or weighed sum) to form a receiver group. Particle velocity data may have been acquired directly or may be computed from accelerometer sensors (for example, by integration). Other types of particle motion sensor may be available. The receivers on the streamers may generate a marine streamer dataset that is achieved in a narrow, wide or multi-azimuth, coil shooting or any configuration towed with constant or variable depth (e.g., slant streamer, BroadSeis profile, over-under streamers), and the seismic data may be generated with an air gun, marine vibrator, or other source element. Source elements may be fired according to any known scheme, e.g., continuously, simultaneously, flip-flop, etc. Receivers may also be used in ocean bottom survey (nodes, cables, or other with air gun, marine vibrator or other source), land dataset (dynamite, vibrator or other source), or a combination of two or more dataset types. The data may have been calibrated before applying the processes discussed herein. The methods may be used for one-sided or split-spread acquisition.

Figure 8:
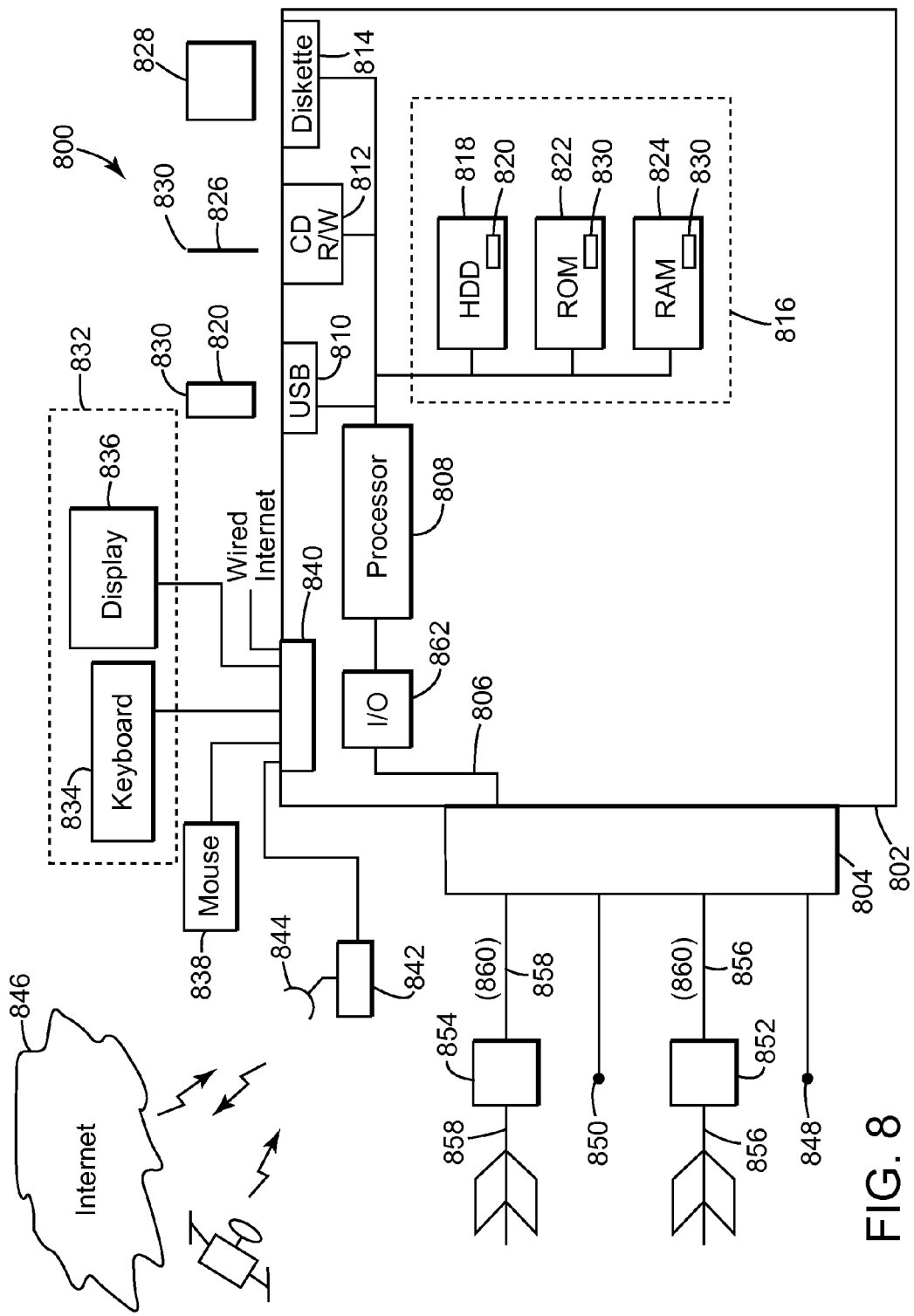
FIG. 8 depicts an exemplary data processing device or system which can be used to implement the embodiments.

It can also be possible to process hydrophone and particle motion data independently. The separate results may be combined afterwards, for example, by selecting different temporal frequency ranges based on signal-to-noise ratio data. At low frequencies, particle velocity data may be too noisy to be of value. Therefore, it may be necessary to use a pressure-only solution for low frequencies, and make use of a combined hydrophone-particle velocity solution for higher frequencies. The computing device(s) or other network nodes involved in regularizing and/or optimizing frequency content of multi-component seismic data as set forth in the above described embodiments may be any type of computing device capable of processing and communicating seismic data associated with a seismic survey. An example of a representative computing system capable of carrying out operations in accordance with these embodiments is illustrated in FIG. 8. System 800 includes, among other items, server 802, source/receiver interface 804, internal data/communications bus (bus) 806, processor(s) 808, universal serial bus (USB) port 810, compact disk (CD)/digital video disk (DVD) read/write (R/W) drive 812, floppy diskette drive 814 (though less used currently, many servers still include this device), and data storage unit 816.

Data storage unit 816 itself can comprise hard disk drive (HDD) 818 (these can include conventional magnetic storage media, but, as is becoming increasingly more prevalent, can include flash drive-type mass storage devices 820, among other types), ROM device(s) 822 (these can include electrically erasable (EE) programmable ROM (EEPROM) devices, ultra-violet erasable PROM devices (UVPROMs), among other types), and random access memory (RAM) devices 824. Usable with USB port 810 is flash drive device 820, and usable with CD/DVD R/W device 812 are CD/DVD disks 826 (which can be both read and write-able). Usable with diskette drive device 814 are floppy diskettes 828. Each of the memory storage devices, or the memory storage media (818, 820, 822, 824, 826, and 828, among other types), can contain parts or components, or in its entirety, executable software programming code (software) 830 that can implement part or all of the portions of the method described herein. Further, processor 808 itself can contain one or different types of memory storage devices (most probably, but not in a limiting manner, RAM memory storage media 824) that can store all or some of the components of software 830.

In addition to the above described components, system 800 also comprises user console 832, which can include keyboard 834, display 836, and mouse 838. All of these components are known to those of ordinary skill in the art, and this description includes all known and future variants of these types of devices. Display 836 can be any type of known display or presentation screen, such as liquid crystal displays (LCDs), light emitting diode displays (LEDs), plasma displays, cathode ray tubes (CRTs), among others. User console 832 can include one or more user interface mechanisms such as a mouse, keyboard, microphone, touch pad, touch screen, voice-recognition system, among other inter-active inter-communicative devices.

User console 832, and its components if separately provided, interface with server 802 via server input/output (I/O) interface 840, which can be an RS232, Ethernet, USB or other type of communications port, or can include all or some of these, and further includes any other type of communications means, presently known or further developed. System 800 can further include communications satellite/global positioning system (GPS) transceiver device 842, to which is electrically connected at least one antenna 844 (according to an embodiment, there would be at least one GPS receiver-only antenna, and at least one separate satellite bi-directional communications antenna). System 800 can access internet 846, either through a hard wired connection, via I/O interface 840 directly, or wirelessly via antenna 844, and transceiver 842.

Server 802 can be coupled to other computing devices, such as those that operate or control the equipment of ship 102 of FIG. 1, via one or more networks. Server 802 may be part of a larger network configuration as in a global area network (GAN) (e.g., internet 846), which ultimately allows connection to various landlines.

According to a further embodiment, system 800, being designed for use in seismic exploration, will interface with one or more sources 848, 850 and one or more receivers 852, 854. As further previously discussed, sources 848, 850 and receivers 852, 854 can communicate with server 802 either through an electrical cable that is part of streamer 856, 858, or via a wireless system that can communicate via antenna 844 and transceiver 842 (collectively described as communications conduit 860).

According to further exemplary embodiments, user console 832 provides a means for personnel to enter commands and configuration into system 800 (e.g., via a keyboard, mouse, buttons, switches, touch screen and/or joy stick). Display device 836 can be used to show: source/receiver 856, 858 position; visual representations of acquired data; source 848, 850 and receiver 852, 854 status information;

survey information; and other information important to the seismic data acquisition process. Source and receiver interface unit 804 can receive the seismic data from receiver 852, 854 though communication conduit 860 (discussed above). Source and receiver interface unit 804 can also communicate bi-directionally with sources 848, 850 through the communication conduit 860. Excitation signals, control signals, output signals and status information related to source 848, 850 can be exchanged by communication conduit 860 between system 800 and source 848, 850.

System 800 can be used to implement the methods described above associated with regularizing and/or optimizing frequency content of multi-component seismic trace data according to an exemplary embodiment. Hardware, firmware, software or a combination thereof may be used to perform the various steps and operations described herein.

It should be noted in the embodiments described herein that these techniques can be applied in either an "offline", e.g., at a land-based data processing center or an "online" manner, i.e., in near real time while onboard the seismic vessel. For example, predicting a desired seismic quantity at a desired location of a desired depth can occur as the seismic data is recorded onboard the seismic vessel. In this case, it is possible for the prediction to be generated as a measure of the quality of the sampling run.

The disclosed exemplary embodiments provide a server node, and a method for regularizing and/or optimizing frequency content of multi-component seismic trace data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for regularizing seismic data acquired over a subsurface, said method comprising:
   receiving the seismic data, wherein the seismic data includes pressure and particle motion measurements;
   selecting Fresnel zones at various depths in the subsurface;
   regularizing and frequency optimizing the seismic data to desired positions based on the selected Fresnel zones to obtain a regularized seismic dataset that includes new seismic traces; and
   generating an image of the subsurface based on the regularized seismic dataset,
   wherein the step of regularizing and frequency optimizing includes generating at least one new seismic trace within a first Fresnel zone of the selected Fresnel zones, based on acquired traces that fall into the first Fresnel zone, and iterating the step of generating at least one new seismic trace for each of the selected Fresnel zones at the various depths, and
   wherein the at least one new seismic trace is located at one of the desired positions and extends through the selected Fresnel zones.

2. The method of claim 1, wherein the seismic data is sorted into a common midpoint domain.

3. The method of claim 1, wherein a frequency content of the at least one new seismic trace is optimized based on the acquired traces that fall into the first Fresnel zone and a given criteria.

4. The method of claim 3, wherein the criteria includes one of spectral flatness, spectral shape, and lack of aliasing.

5. The method of claim 1, wherein the seismic data is acquired with seismic receivers located on streamers and the desired positions are between the streamers.

6. The method of claim 1, wherein the desired positions form a grid having a same step on inline and cross-line directions.

7. The method of claim 1, wherein the first Fresnel zone corresponds to a given frequency.

8. The method of claim 7, wherein the given frequency is between 20 and 30 Hz.

9. The method of claim 7, wherein the first Fresnel zone is determined by an intersection between a given plane in the subsurface and a wave-front that propagates one fourth of a wavelength from another wave-front that contacts the given plane at a single point.

10. The method of claim 1, wherein the frequency optimizing is iterated over an increasingly refined binning grid.

11. The method of claim 1, wherein another seismic data, associated with another seismic survey, is regularized and frequency optimized to match the regularized seismic dataset for generating a 4-D seismic image.

12. A computing system for regularizing seismic data acquired over a subsurface, the system comprising:
    an interface for receiving the seismic data, wherein the seismic data includes pressure and particle motion measurements; and
    a processor connected to the interface and configured to, select Fresnel zones at various depths in the subsurface;
    regularize and frequency optimize the seismic data to desired positions based on the selected Fresnel zones to obtain a regularized seismic dataset that includes new seismic traces; and
    generate an image of the subsurface based on the regularized seismic dataset,
    wherein the step to regularize and frequency optimize includes generating at least one new seismic trace within a first Fresnel zone of the selected Fresnel zones, based on acquired traces that fall into the first Fresnel zone, and iterating the step of generating at least one new seismic trace for each of the selected Fresnel zones at the various depths, and
    wherein the at least one new seismic trace is located at one of the desired positions and extends through the selected Fresnel zones.

13. The computing system of claim 12, wherein the seismic data is sorted into a common midpoint domain.

14. The computing system of claim 12, wherein a frequency content of the at least one new seismic trace is optimized based on the acquired traces that fall into the first Fresnel zone and a given criteria.

15. The computing system of claim 14, wherein the criteria includes one of spectral flatness, spectral shape, and lack of aliasing.

16. The computing system of claim 12, wherein the seismic data is acquired with seismic receivers located on streamers and the desired positions are between the streamers.

17. The computing system of claim 12, wherein the desired positions form a grid having a same step on inline and cross-line directions.

18. A non-transitory computer readable medium including computer executable instructions, wherein the instructions, when executed by a computer, implement a method for regularizing seismic data acquired over a subsurface, the instructions comprising:

receiving the seismic data, wherein the seismic data includes pressure and particle motion measurements;

selecting Fresnel zones at various depths in the subsurface;

regularizing and frequency optimizing the seismic data to desired positions based on the selected Fresnel zones to obtain a regularized seismic dataset that includes new seismic traces; and generating an image of the subsurface based on the regularized seismic dataset, wherein the step of regularizing and frequency optimizing includes generating at least one new seismic trace within a first Fresnel zone of the selected Fresnel zones, based on acquired traces that fall into the first Fresnel zone, and iterating the step of generating at least one new seismic trace for each of the selected Fresnel zones at the various depths, and wherein the at least one new seismic trace is located at one of the desired positions and extends through the selected Fresnel zones.

* * * * *